2,504,631

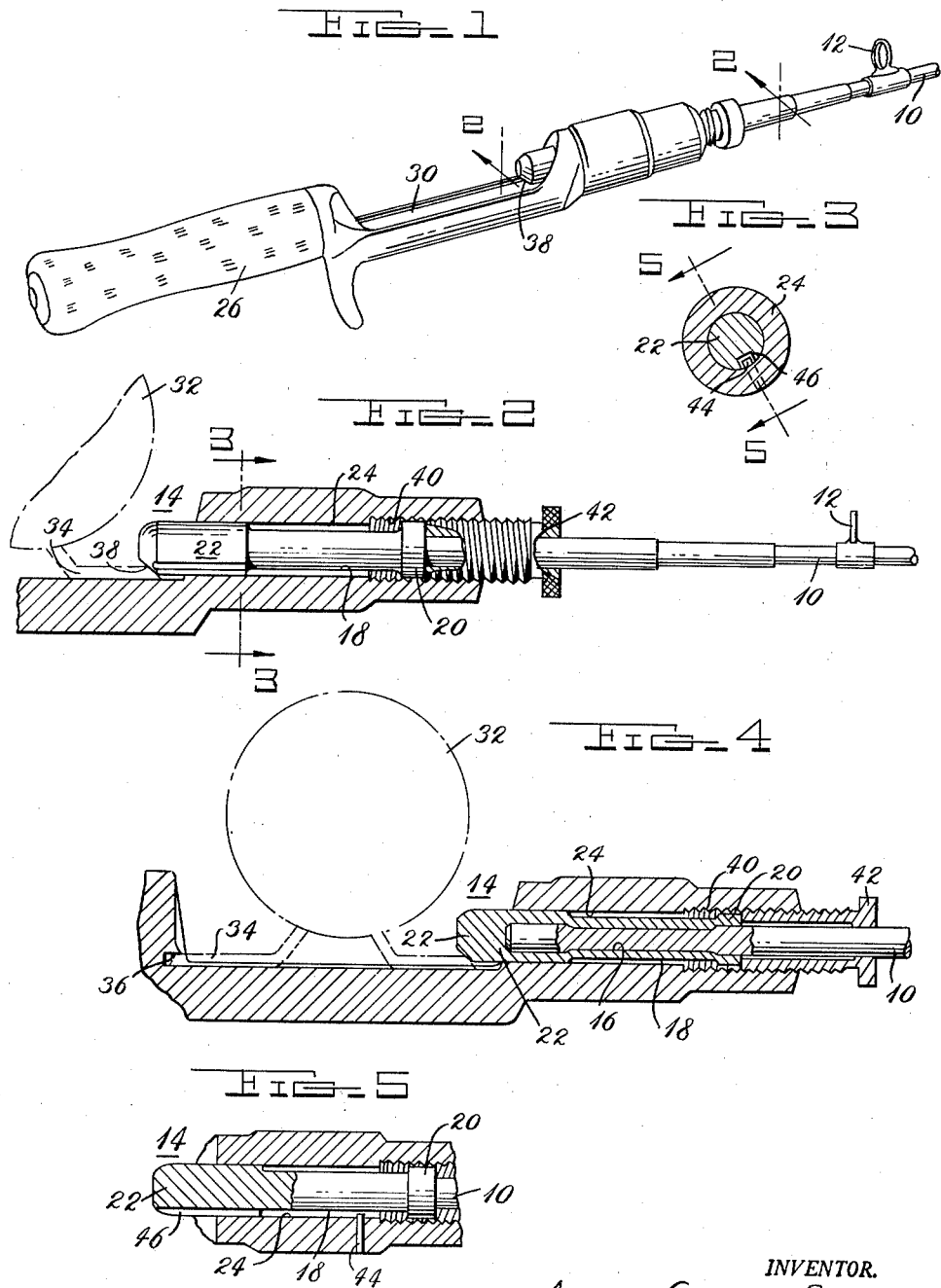
April 18, 1950     A. C. BISHOFF     2,504,631
FISHING ROD ASSEMBLY
Filed Aug. 11, 1947
INVENTOR.
AUGUST CHARLES BISHOFF
BY
Burton & Parker
ATTORNEYS Patented Apr. 18, 1950

UNITED STATES PATENT OFFICE 2,504,631

FISHING ROD ASSEMBLY

August Charles Bishoff, Detroit, Mich.

Application August 11, 1947, Serial No. 767,951

4 Claims. (Cl. 43—22)

This invention relates to an improved fishing rod assembly and primarily that portion thereof which includes the handle and the butt end of the rod to which the handle is secured.

An object is to provide an improved fishing rod assembly of the character described which includes a rod portion and a handle portion which is capable of being removably secured upon the butt end of the rod. The handle portion is provided with a reel seat. The construction is such that upon the securing of the handle upon the rod the reel may be secured upon its seat through the same operation and by the same means.

The invention herein disclosed is an improvement upon the invention disclosed in my application Serial No. 661,855 filed April 12, 1946, now Patent No. 2,483,519, October 4, 1949.

An object of this invention is to provide a fishing rod assembly wherein the butt end of the rod may be extended through the socket to overhang the reel seat and to secure the reel therein and the parts so cooperate with each other that upon the removal of the reel the rod is prevented from extending entirely over the reel seat.

Another object is to provide a fishing rod assembly wherein the butt end of the rod is slidable through the socket of the handle and at one position within the socket is rotatable therein but in another position within the socket is incapable of being rotated therein.

A meritorious feature of the construction is that the butt end of the rod which is slidably receivable within the socket of the handle is so formed as to cooperate with the interior of the socket as to be receivable therethrough to overhang the reel seat but to be limited by a part of the socket to the extent of its overhang of the reel seat.

More particularly the butt end of the rod which is slidably receivable within the socket is of enlarged diameter and is provided with a circumferential groove adapted to receive a part which projects interiorly of the socket so as to permit rotation of the rod therein but which part is adapted to engage a portion of the butt end of the rod to limit the slidable movement of the rod axially through the socket.

The enlarged diameter butt end of the rod is formed of a tubular part which is received over the rear end of the rod per se. To secure it to the rear end of the rod it may be swaged thereon. This swaging results in the formation of the aforementioned circumferential groove about the butt end portion. At opposite ends of this circumferential groove the butt end portion exhibits what may be termed front and rear shoulders. These shoulders form a sliding fit within the socket. The rear shoulder is adapted to engage the base of the reel and overhang the reel seat. A nut is receivable over the rod and is adapted to be threaded into the outer end of the socket and to engage the butt end portion of the rod to hold the rod within the socket.

Other objects, advantages and meritorious features will more fully appear in the following description, claims and accompanying drawing wherein:

Fig. 1 is a perspective of the handle end portion of a fishing rod exhibiting my invention.

Fig. 2 is a vertical sectional view through a fragment of the structure of Fig. 1 taken on the section line 2—2 of Fig. 1.

Fig. 3 is a vertical sectional view taken on the line 3—3 of Fig. 2.

Fig. 4 is a view similar to that shown in Fig. 2 and taken on substantially the same section line but showing the rear end portion of the rod in section instead of elevation as appears in Fig. 2.

Fig. 5 is a sectional view taken on the line 5—5 of Fig. 3.

The fishing rod which may be a metal rod of solid or tubular construction and tapered according to good design is indicated by the numeral 10. This rod is provided with the usual line guides 12 and an enlarged diameter butt end portion 14 is secured thereto. This butt end portion is of a tubular shape. The rear end of the rod may be provided with a groove thereabout of reduced diameter indicated by the numeral 16 in Fig. 4 and the butt end portion may be swaged into such groove as shown in Fig. 4. This swaging results in the formation of a groove 18 about the butt end portion as shown in Figs. 2, 4 and 5.

At opposite ends of this reduced diameter portion 18 the butt of the rod exhibits what may be termed a front shoulder 20 and a rear shoulder 22. These shoulders are of a diameter to form a free sliding fit within the socket 24 of a handle portion 26. This handle portion exhibits a reel seat 30. A reel such as is indicated in dotted outline by the numeral 32 and provided with a base 34 may be mounted upon this seat. The rear end of the base is adapted to be received within the undercut 36 at the rear end of the reel seat. A front portion of the base is adapted to be engaged by the rear shoulder 22 as shown in Figs. 2 and 4. The end of the shoulder 22 is provided with a beveled recess 38 adapted to engage the front end of the reel base to hold the reel upon the seat as shown particularly in Figs. 2 and 4.

The socket portion of the handle is internally threaded at 40. Nut 42 is slidably received over the rod 10 as shown in Figs. 2 and 4. This nut is adapted to be threaded within the outer end of the socket and to engage the front shoulder 20 of the butt end of the rod as shown in Fig. 4 to hold the reel upon its seat.

The socket portion of the handle is provided with a part 44 in the form of a pin which projects interiorly of the socket as shown particularly in Fig. 5. The rear shoulder 22 is provided with a linear slot 46 designed to pass over the pin to permit the butt end of the rod to overhang the reel seat as shown in the figures of the drawing. When the butt end of the rod overhangs the reel seat this pin is located within the groove 18 that encircles the butt end of the rod and permits the rod to be rotated within the socket.

When the butt end of the rod is forced rearwardly to overhang the reel seat the beveled recess 38 is brought into engagement with the end of the reel base and the rod is rotated to line it up so that the line guides are properly positioned. The retaining nut 42 holds the rod in this position. In the rearward movement of the butt end of the rod the groove 46 of the rear shoulder portion 22 passes over the pin 44.

When it is desired to disassemble the construction, the nut 42 is loosened and the rod moved forwardly. This releases the reel. The rod may then be rotated to position the line guides on the same side as the finger tip projection on the handle so that the rod and handle may, if desired, be jointly assembled within a carrying case of small size. In such position it is apparent that the pin will engage the front shoulder 20 of the butt so as to prevent the butt end of the rod being moved over a limited distance rearwardly.

What I claim is:

1. In a fishing rod assembly, a handle having a reel seat and provided with a socket extending forwardly from the seat and adapted to receive one end of a rod, and a rod having an end portion receivable within the socket and slidable therethrough to overhang the reel seat, said end portion of the rod having front and rear shoulders and having a section of reduced diameter between said shoulders, and the rear shoulder having a linear slot therethrough, said socket having a part projecting interiorly thereof slidable through the linear slot in said rear shoulder and adapted to engage the front shoulder to limit the rearward slidable movement of the end portion of the rod through the socket.

2. A fishing rod assembly comprising, in combination, a handle having a reel seat provided with a socket extending forwardly thereof and adapted to receive the rear end of the rod, a rod having a rear end portion provided with front and rear shoulders spaced apart by a section of reduced diameter, said front and rear shoulders having a diameter which forms a sliding fit within the socket, said socket having an internally threaded forward end, and a nut receivable over the rod to engage said front shoulder and threaded within the threaded forward end of the socket to hold the rod therein, said socket having an internal projection adapted to engage the front shoulder to limit the rearward movement of the rod through the socket while permitting sufficient rearward movement thereof to enable the rear shoulder to overhang the reel seat, said rear shoulder provided with a passageway adapted to pass over said projection, said intermediate section of reduced diameter adapted to clear said projection and permit rotation of the end portion of the rod within the socket.

3. In a fishing rod assembly, a handle having a reel seat provided with a socket extending forwardly thereof and adapted to receive the rear end of a rod therethrough, and a rod having a rear end portion of enlarged diameter receivable through said socket to overhang the reel seat, said enlarged diameter end portion of the rod having a front shoulder and a rear shoulder separated by a circumferential groove, said rear shoulder having a linear slot, and said socket having a pin projecting interiorly thereof, and slidable through said slot.

4. In a fishing rod assembly, a handle having a reel seat provided with a socket extending forwardly thereof and adapted to receive the rear end of a rod therethrough, and a rod having a rear end portion of enlarged diameter receivable through said socket to overhang the reel seat, said enlarged diameter end portion having a front shoulder and a rear shoulder separated by a circumferential groove, said rear shoulder having a linear slot, said socket having a pin projecting interiorly thereof, and said rear shoulder having a depression in its outer end offset circumferentially relative to the slot through said shoulder.

AUGUST CHARLES BISHOFF.

REFERENCES CITED

The following references are of record in the file of this patent:

UNITED STATES PATENTS

| Number | Name | Date |
| --- | --- | --- |
| 524,033 | Turner | Aug. 7, 1894 |
| 569,995 | Boyd | Oct. 27, 1896 |
| 1,591,122 | Gephart | July 6, 1926 |
| 1,785,027 | Gephart | Dec. 16, 1930 |
| 1,886,086 | Damon | Nov. 1, 1932 |
| 1,920,966 | Carlson | Aug. 8, 1933 |
| 2,230,229 | Benson | Feb. 4, 1941 |
| 2,327,650 | Klein | Aug. 24, 1943 |
| 2,421,240 | Camburn | May 27, 1947 |